No. 615,913. Patented Dec. 13, 1898.
F. G. SARGENT.
WOOL DRYING MACHINE.
(Application filed Oct. 1, 1896.)
(No Model.) 2 Sheets—Sheet 1.

WITNESSES:
N. P. Ockington
Louis de Rochemont

INVENTOR
Frederick G. Sargent
BY
Lepine Hall Rice
ATTORNEY.

No. 615,913. Patented Dec. 13, 1898.
F. G. SARGENT.
WOOL DRYING MACHINE.
(Application filed Oct. 1, 1896.)
(No Model.) 2 Sheets—Sheet 2.

WITNESSES
N. P. Ockington
Louis de Rochemont

INVENTOR
Frederick G. Sargent
by his attorney,
Lephine Hall Rice

UNITED STATES PATENT OFFICE.

FREDERICK G. SARGENT, OF GRANITEVILLE, MASSACHUSETTS.

WOOL-DRYING MACHINE.

SPECIFICATION forming part of Letters Patent No. 615,913, dated December 13, 1898.

Application filed October 1, 1896. Serial No. 607,517. (No model.)

*To all whom it may concern:*

Be it known that I, FREDERICK G. SARGENT, of Graniteville, in the county of Middlesex and State of Massachusetts, have invented a new and useful Improvement in Wool-Drying Machines, of which the following, taken in connection with the accompanying drawings, is a specification.

Wool-drying machines are in extensive use in which a series of endless aprons or carriers is disposed within a suitable casing and arranged in a staggered order or relation one above another, the wool in a moist condition being placed upon the topmost apron or carrier of the series and carried thereby lengthwise of the casing, it being dropped at the remote end of such apron or carrier onto the next one below and transported by the latter in the reverse direction, dropping therefrom on arriving at the discharging end of such second apron or carrier onto the third one, being meanwhile exposed to a circulation of air, usually heated.

My invention relates more particularly to wool-driers of this type, and has for its object to provide a means by which as the wool drops from one apron or carrier to the next in the series the wool shall be arrested temporarily and held exposed to the moving currents of air as well as moved and opened up somewhat.

Special aims of the invention are to increase the efficiency of the machine, expedite the drying, and enable the drying to be performed with a lower steam-pressure in the heating-pipes than heretofore has been found necessary.

The invention will be described first with reference to the accompanying drawings, after which the distinguishing characteristics thereof will be particularly pointed out and distinctly defined in the claims at the close of this specification.

The form in which I prefer to embody my invention is that illustrated in the accompanying drawings, in which—

Figure 1:
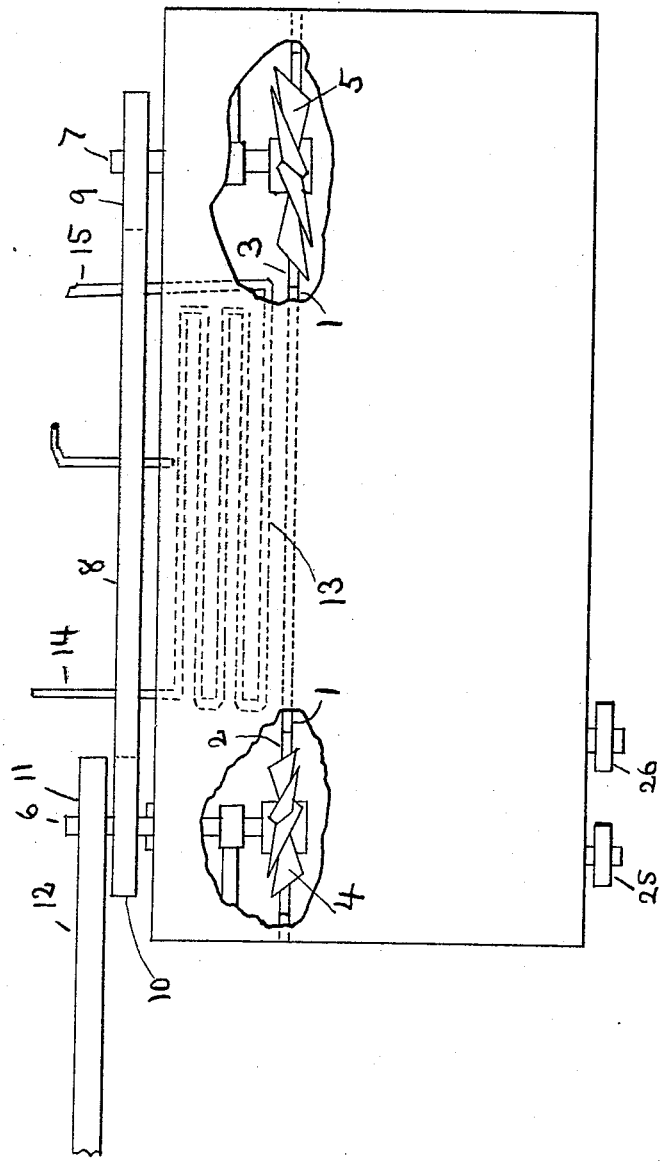
Figure 2:
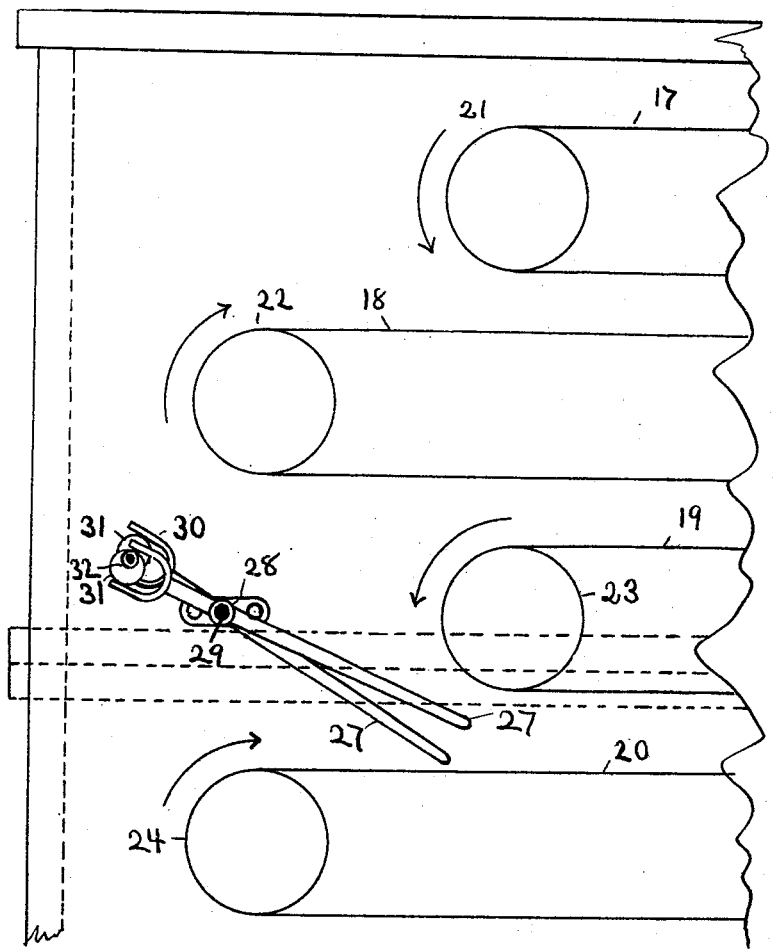
Figure 3:
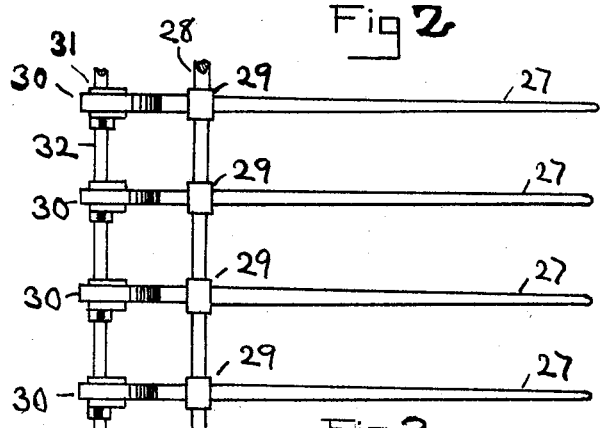

Figure 1 is a top view of my machine; Fig. 2, a side view of one end of the interior, and Fig. 3 a top view of the tine mechanism.

The style of wool-drier to which I apply my improvement is old and well known and has been under the charge and observation of mechanics for years; but my improvement enables machines which have hitherto required a steam-pressure of twenty-five pounds to be run with ten pounds or even on some wools without any steam at all. The casing of the machine is shown in Fig. 1 divided lengthwise by a partition 1, the two compartments thus formed communicating only by two openings 2 3. In these openings are placed blower-fans 4 5, which are mounted on the inner ends of shafts 6 7. The shafts project outside the drier and are belted together by the belt 8 running over the pulleys 9 10. From any convenient counter-shaft a belt 12 runs over the pulley 11, mounted on the shaft 6, and gives motion to both fans. The blades of the fans are set so as to create opposite currents, as shown by the arrows, thus producing a constant circulation of the air in the drier first through the heating-compartment and then through the drying-compartment, and so on. In the heating-compartment are coils of steam-pipe 13, whose ends 14 15 lead to the boiler. These coils of course merely heat the circulating air.

In the drying-chamber is a set of traveling aprons 17 18 19 20, one above the other and staggered with relation to one another in usual manner, each conveying the wool across the chamber and dropping it upon the next below. The aprons run over rollers 21 22 23 24, &c., whose shafts project outside the chamber and are provided with the pulleys 25 26, by which they may be suitably driven.

In applying my invention I arrange a set of tines 27 below the discharge end of each apron and in the path of the wool falling from one apron to the next, these tines being inclined downwardly toward the upper surface of the apron which is to receive the wool, and I cause them to vibrate by cam mechanism acting upon the rear ends thereof. A fixed rod 28 runs across the drying-chamber, and on this are journaled sleeves 29, placed about five inches apart, which form the middle portion of the tines. The rear ends of the tines are U shape, 30, embracing cams or eccentric disks 31, fixed on the revolving shaft 32. The cams are preferably set alternately, so that adjacent tines will be moving in opposite directions. All this actuating mechanism, as well as the rod 28, is well out of the line of the falling wool. Consequently there is no chance for long wool to clog them. The wool in its descent falls upon these tines and is arrested thereby in its descent to the next adjacent apron. While upheld above the surface of the said apron by the said tines, it is fully exposed to the currents of air which pass through the sheet of wool, reaching all the fibers thereof. By the movement of the tines the wool gets thoroughly opened up, bunches are opened up and the air is allowed to go through them, and the wool is deposited evenly on the apron, with the important saving in use of steam above noted, as well as a quicker, more even, and more thorough drying. The current of air which passes through the falling sheet of wool during its agitation by the tines coöperates in producing this result. The alternating movements of the adjacent tines facilitate the opening up of the wool and secure a more complete exposure of the same to the action of the currents of air.

I therefore claim as new and of my invention—

1. The combination with the series of endless carriers of a wool-drier, each delivering to the next in succession, of a series of tines arranged at the discharge end of an upper carrier and operating to receive and uphold the wool as it falls therefrom onto the next carrier below, and means to vibrate the said tines whereby to open up the wool and thereby expose all portions thereof to the action of the currents of air which pass through the apparatus, substantially as described.

2. The combination with the series of endless carriers of a wool-drier, each delivering to the next in succession, of a series of tines arranged at the discharge end of an upper carrier and operating to receive and uphold the wool as it falls therefrom onto the next carrier below, the said tines inclining downward toward the latter carrier, and means to vibrate the said tines whereby to open up the wool and thereby expose all portions thereof to the action of the currents of air which pass through the apparatus, substantially as described.

3. The combination with the series of endless carriers of a wool-drier, each delivering to the next in succession, of a series of tines arranged at the discharge end of an upper carrier and operating to receive and uphold the wool as it falls therefrom onto the next carrier below, and means to actuate the said tines independently, whereby to open up the wool and thereby expose all portions thereof to the action of the currents of air which pass through the apparatus, substantially as described.

4. The combination with the series of endless carriers of a wool-drier, each delivering to the next in succession, of a series of tines arranged at the discharge end of an upper carrier and operating to receive and hold the wool as it falls therefrom onto the next carrier below, and means to vibrate the alternate tines in opposite directions, whereby to open up the wool and thereby expose all portions thereof to the action of the currents of air which pass through the apparatus, substantially as described.

5. The combination with the series of endless carriers of a wool-drier, each delivering to the next in succession, of a series of tines arranged at the discharge end of an upper carrier and operating to receive and uphold the wool as it falls onto the next carrier below, and a shaft provided with a series of cams or eccentrics to actuate the said tines in an alternating succession whereby to open up the wool and thereby expose all portions thereof to the action of the current of air which passes through the apparatus, substantially as described.

In testimony whereof I have signed my name to this specification, in the presence of two subscribing witnesses, on this 28th day of September, A. D. 1896.

FREDERICK G. SARGENT.

Witnesses:
CHAS. G. SARGENT,
A. B. McGOWN.